(12) United States Patent
Dyllong et al.

(10) Patent No.: US 9,775,411 B2
(45) Date of Patent: Oct. 3, 2017

(54) SYSTEM FOR MOUNTING OF COMPONENTS

(71) Applicant: Airbus Operations GmbH, Hamburg (DE)

(72) Inventors: Sebastian Dyllong, Hamburg (DE); Robert Alexander Goehlich, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/512,508

(22) Filed: Oct. 13, 2014

(65) Prior Publication Data

US 2015/0104632 A1    Apr. 16, 2015

(30) Foreign Application Priority Data

Oct. 15, 2013   (EP) .................................... 13188734

(51) Int. Cl.
*A44B 18/00*   (2006.01)
*B64C 1/00*   (2006.01)
(Continued)

(52) U.S. Cl.
CPC ...... *A44B 18/0053* (2013.01); *A44B 18/0019* (2013.01); *B64C 1/12* (2013.01);
(Continued)

(58) Field of Classification Search
CPC . Y10T 24/2792; Y10T 24/27; A44B 18/0049; A44B 18/0065
(Continued)

(56) References Cited

U.S. PATENT DOCUMENTS 3,574,107 A * 4/1971 Hurka ..................... E01C 13/12
404/32
4,216,257 A * 8/1980 Schams .............. A44B 18/0019
24/448

(Continued)

FOREIGN PATENT DOCUMENTS

DE   10 2011 117185 A1   5/2013
EP      0 761 116 A1   3/1997

OTHER PUBLICATIONS

EP Search Report Mar. 6, 2014.

*Primary Examiner* — Robert J Sandy
*Assistant Examiner* — Rowland Do
(74) *Attorney, Agent, or Firm* — Lerner, David, Littenberg, Krumholz & Mentlik, LLP

(57) ABSTRACT

A mounting system includes a first and second mounting part having a first and second base part with a first and second plurality of first and second locking means respectively, for mounting two components to each other. Each of the locking means is attached to the respective base part and is provided with an attachment part extending from the base part, and a distal part provided as a head portion with at least one engaging section protruding sidewards over the attachment part. The locking means are laterally displaceable in relation to the base part to allow sidewards displacement of the engaging sections for engagement and disengagement of the locking means and thus the first and the second base. In the engaged state, latching means are provided blocking the sidewards displacement of the engaging sections to an extent that a disengagement of the locking means is prevented.

13 Claims, 6 Drawing Sheets

(51) Int. Cl.
*B64C 1/12* (2006.01)
*F16B 5/07* (2006.01)
*B64C 3/26* (2006.01)
*F16B 1/00* (2006.01)

(52) U.S. Cl.
CPC ............... *B64C 3/26* (2013.01); *F16B 5/07* (2013.01); *F16B 2001/0028* (2013.01); *Y10T 24/2708* (2015.01); *Y10T 29/49826* (2015.01); *Y10T 428/249923* (2015.04)

(58) Field of Classification Search
USPC .......................................................... 24/452
See application file for complete search history.

(56) References Cited

U.S. PATENT DOCUMENTS

| | | | | |
|---|---|---|---|---|
| 4,887,338 | A | * | 12/1989 | Handler ................ A44B 18/00 24/306 |
| 5,611,122 | A | | 3/1997 | Torigoe et al. |
| 5,819,391 | A | * | 10/1998 | Matsushima ...... A44B 18/0003 24/442 |
| 7,422,783 | B2 | * | 9/2008 | Tremblay ............ A44B 18/008 24/442 |
| 8,375,529 | B1 | * | 2/2013 | Duffy ................ A44B 18/0053 24/452 |
| 2008/0113152 | A1 | * | 5/2008 | Provost .................... B32B 5/26 428/100 |
| 2013/0067701 | A1 | * | 3/2013 | Grady ................ A44B 18/0049 24/442 |
| 2013/0105067 | A1 | | 5/2013 | Benthien et al. |
| 2013/0125354 | A1 | | 5/2013 | Benthien et al. |

* cited by examiner

SYSTEM FOR MOUNTING OF COMPONENTS

FIELD OF THE INVENTION

The present invention relates to mounting of components, and relates in particular to a mounting system, to a vehicle, to a method for mounting of components and to a use of a mounting system in an aircraft or spacecraft.

BACKGROUND OF THE INVENTION

During the manufacturing procedure, for example of airplanes, helicopters, satellites, space station modules, rocket stage modules, space ferries or other types of vehicles, different components are mounted to each other. For example, in airplanes, stringers and frames are provided, as well as outer skin components, which are mounted to form shell portions, e.g. sub-shells. Stringers, brackets and clips may be riveted or welded on the sub-shell. The sub-shells are assembled to form a fuselage structure. Stringers and frames are fixed to each other, for example with butt-joints. However, it has been shown that mounting by rivets or the like may require complex drilling procedures, which can be time-consuming. Further, manufacturing tolerances may require pre-alignment before the final mounting.

BRIEF SUMMARY OF THE INVENTION

There may thus be a need for an improved mounting system for mounting components providing an economically improved manufacturing procedure.

It should be noted that the following described aspects of the invention apply also for the mounting system, for the vehicle, for the method for mounting of components, and for the use of a mounting system in an aircraft or spacecraft.

According to an embodiment of the present invention, a mounting system is provided that comprises a first mounting part and a second mounting part. The first mounting part comprises a first base part with a first plurality of first locking means. The second mounting part comprises a second base part with a second plurality of second locking means. Components are mountable to each other by the first and the second mounting parts. Each of the locking means is attached to the respective base part and is provided with an attachment part extending from the base part, and a distal part at the opposing end of the attachment part. The distal part is provided as a head portion with at least one engaging section protruding sidewards over the attachment part. The first and second locking means are provided laterally displaceable in relation to the respective base part at least with the distal part to allow sidewards displacement of the engaging sections for engagement and disengagement of the locking means. The first and second locking means provide a releasable engagement of the first and the second base. In the engaged state, latching means are provided blocking the sidewards displacement of the engaging sections to an extent that a disengagement of the locking means is prevented.

This provides the advantage that two components can be mounted to each other by engaging of the first and the second locking means. Since the first and second locking means provide a releasable engagement and thus a releasable attachment of the components, the two components can also be demounted for aligning purposes. Due to the provision of the first and second locking means, further, time-absorbing procedures such as drilling and the like are omitted. Since the first and second locking means provide a releasable engagement, the latching means are provided to ensure a secure engagement and thus a secure mounting of the two components, i.e., the latching means provide a secure fixation for mounting purposes.

The term "secure fixation" means a pre-defined mount for the transmission of pre-defined forces as a replacement for, or an addition to conventional connections such as riveting, welding, gluing, and the like.

The term "blocking" relates to prevent a mechanical relative movement of the locking means. To ensure that the locking means stay securely engaged, at least approximately 50% of the engaging area are maintained due to the hindering of the relative movement.

The term "locking means" relates to the engaging and thus locking function of the two mounting parts.

The term "extent" relates to a degree or percentage of, for example, at least approximately 30% of the engaging sections to stay engaged. The extent may relate to an example of approximately 50%, or approximately 75% of the engaging sections to be maintained. In an example, a maximum deviation of approximately 10% is provided.

In an example, the base parts are provided as flexible portions, such as flexible strips or otherwise shaped flat portions. The flexibility allows abutting against three-dimensionally formed surface portions of the components that are attached to each other by the mounting system.

In a further example, the base parts are provided integrally with the components itself (see also below).

The term "components" relates to different parts or elements that are attached to each other or mounted to, or connected with each other, for example infrastructural elements attached and mounted to structural parts, or support parts mounted on structural parts.

The attachment part is thus connected to the base on one end. The term "distal part" relates to the "free" end of the attachment part. The distal part is also referred to as connecting portion or engaging head portion of the locking means.

The first base and the second base are separately securely attachable to components to be mounted to each other.

In one example, the locking means are formed elastically to allow the lateral displacement. The term "lateral" relates to the displacement in a direction transverse to the longitudinal axis of the locking means, i.e. in a direction of an extension of the base parts. The term "blocking" refers to restricting the sidewards displacement to such an extent that the locking means stay engaged.

According to an example, at least one of the first and the second base parts is formed integrally with a component to be mounted to another component, wherein the locking means are extending from the component.

Thus, by providing the locking means already formed on the component, separate steps of applying the mounting system to the components are not needed. Rather, two components can directly be attached to each other and thus securely connected.

According to an example, the first and/or the second locking means are provided with at least two different attachment depths in the first and/or second base part respectively.

In one example, the locking means are provided with different attachment or anchoring depths on one side, in another example, the different attachment or anchoring depths are provided on both sides.

For example, the component is a laminate structure, and the locking means are connected to different layers of the laminate structure.

Thus, an improved transmission of forces between the components is provided, since the force transmission reaches different layers of the component, and thus provides improved rigidity in terms of force transmission in particular.

According to an example, the latching means are removable to provide temporal secure fixation of the components to be mounted to each other.

According to an example, the latching means are removable when the locking means are in engagement with each other forming a mounting state of the two mounting parts.

In other words, the removability of the latching means is given also when the two parts are mounted to each other.

Thus, besides providing aligning possibilities, the components can be securely fixed, but can be demounted, for example for dismantling or retrofitting purposes, or also for inspection, maintenance and repair purposes.

In an alternative example, the latching means are securely fixable to provide permanent secure fixation of the components mounted to each other.

According to an example, in the engaged state, a lateral moving space for lateral relative movement of the distal parts is provided between the distal part of each locking means and the respective opposite base part. The latching means occupy at least an essential part of the moving space restricting the lateral movement of the distal parts.

The term "essential" relates to a minimum of approximately 30% of the space that is occupied, for example approximately 50% or approximately 75%.

According to another example, in the engaged state, further moving space for movement of the base parts in a direction towards each other is provided. The latching means occupy at least an essential part of the further moving space restricting the movement of the base parts in the direction towards each other.

The term "lateral movement" relates to a movement in an extending direction of the base parts, i.e., in a direction transverse to the extending direction of the attachment parts. The lateral moving space could also be referred to as horizontal moving space. The further moving space could also be referred to as a vertical moving space. However, the terms "horizontal" and "vertical" do not relate to the actual orientation in space during use.

According to an example, in the blocked state, the latching means are provided along the respective base parts next to the attachment parts extending from the base to restrict:

the sidewards bending movement of the attachment parts; and/or the sidewards movement of the distal parts.

Thus, the latching means provide sufficient restriction of the moving possibilities to ensure the secure engagement of the locking means.

According to an example, the latching means are provided as pins inserted along at least one of the base parts next to the attachment parts extending from the base.

According to an example, the pins are longitudinal elements that, in the inserted state, extend in a direction parallel to the base part and transverse to the attachment parts of the locking means, which attachment parts extend from the base part; wherein the pins, in the inserted state, extend over at least a plurality of attachment parts.

In one example, pins are provided along both base parts. In another example, pins are provided only along one base part.

According to an example, the pins are provided as nail-like structures.

The pins are preferably rigid nails. However, in another example, the pins are provided as nails that are flexible to a small degree.

According to an example, the pins are provided as longitudinal flexible elements that are sufficiently stiff and rigid to restrict the movement of the locking means, but flexibly enough to follow different contours of surfaces upon which the locking means are provided.

This allows a mounting connection that can react flexibly to a certain degree, while the pins ensure that mounting connection is not becoming disengaged, since the pins prevent the locking means to move laterally such that they would disengage.

According to an example, a plurality of the pins is connected to a latch-base forming a comb-shaped interlocking structure. In an example, the latch-base is flexible at least in a bending direction to allow radial bending in a longitudinal direction transverse to the pin direction.

According to an example, the latching means are provided as a space-occupying substance inserted into at least a part of the lateral moving space and/or the further moving space.

In one example, the space-occupying substance is a filler or matrix with a viscosity sufficiently fluid to allow an insertion into the space between the first and the second base, and sufficiently stiff to prevent an unwanted leakage when applied.

In an example, the space-occupying substance is a self-hardening substance that securely blocks the moving space to restrict the moving of the locking means in relation to each other to ensure a secure fixation of the engagement.

According to an example, the latching means are provided as a volume-enlarging substance provided in the distal parts and/or the base parts of the locking means to occupy at least a part of the lateral moving space and/or the further moving space upon activation of the volume-enlarging substance.

The volume-enlarging substance may be provided inserted into the distal parts, or on top of the distal parts. The volume-enlarging substance may be activated by the application of external forces, such as external energy application, for example ultrasound waves, increasing temperatures, or by chemical activation agents inserted into at least a part of the lateral moving space and/or the further moving space, or the like.

According to an example, the first and second locking means are provided as mushroom-like protrusions providing a double-mushroom engagement.

In one example, the mushrooms are provided with a shape having a longitudinal cross-section with: i) a rectangular head, ii) a dome-shaped head, iii) a spherical head, or iv) an arrow-shaped head with protruding arrowhead end portions.

According to an example, the base parts are provided as longitudinal strips with a longitudinal extension direction, and the latching means are laterally insertable in a direction transverse to the longitudinal extension direction.

According to an embodiment of the invention, also a vehicle is provided, comprising a support structure, an enclosing structure, and a technical structure. A plurality of components is provided that are mounted to each other. At least some components are mounted to each other with a mounting system according to one of the above-mentioned examples. The vehicle is an aircraft or spacecraft.

The term "support structure" relates to a fuselage structure, for example. The "enclosing structure" relates to an outer skin or other body-forming components. The "technical structure" relates to infrastructure and devices necessary for the operation and use of the vehicle.

In one example, the vehicle is an aircraft, such as an airplane, a helicopter, an airship or a balloon. In another example, the vehicle is a spacecraft, such as a single space station module or complete space station, a single rocket stage or complete rocket, a space ferry, a space transportation system in general, or a satellite. In still another example, the vehicle is a ship, a train, e.g., a railway car, or an automotive vehicle, such as a coach (bus), a passenger car or a truck. The provision of the vehicle and the application of the mounting system as described above provides the advantage that the manufacturing procedure of the vehicle is facilitated, in particular with respect to the time necessary for aligning and mounting of the components.

According to an aspect of the invention, also a method for mounting of components is provided that comprises the following steps:

a) Providing a first mounting part, comprising a first base part with a first plurality of first locking means, and a second mounting part, comprising a second base part with a second plurality of second locking means. Each of the locking means is attached to the respective base part and is provided with an attachment part extending from the base part, and a distal part at the opposing end of the attachment part. The distal part is provided as a head portion with at least one engaging section protruding sidewards over the attachment part. The first and second locking means are provided laterally displaceable in relation to the respective base part at least with the distal part to allow sidewards displacement of the engaging sections for engagement and disengagement of the locking means. The first and second locking means provide a releasable engagement of the first and the second base.

b) Pressing the first and the second locking means against each other and engaging the first and the second locking means for mounting of the first mounting part and the second mounting part.

c) Providing latching means blocking the sidewards displacement of the engaging sections to an extent that a disengagement of the locking means is prevented.

In an example, the components that are mounted are components in a vehicle.

In one example, between step a) and step b) it is provided a step a1) of attaching the first base and the second base securely to a respective first and second component, wherein the components are to be mounted to each other.

In one example, between step b) and c), the engagement of the locking means is disengaged and the two components are aligned or adjusted in their relative position. For example, the aligning/adjusting is provided in a loop-like manner.

According to an aspect of the present invention, also a use of a mounting system according to one of the above-mentioned examples in an aircraft or spacecraft is provided.

According to an aspect of the invention, a mechanical connection scheme is provided that allows a releasable connection between two components that are to be mounted to each other. The releasable engagement allows aligning and thus facilitates the mounting procedure. Further, the releasable engagement also allows a provisional fixation of the two components, for example during complex assembly procedures of a large number of three-dimensionally complex parts. By providing additional means to block the release-function of the connecting system, a secure mount of the two components can be provided. In other words, the initial releasable connecting scheme is transformed into a mounting system providing a steady mounting state. The connection is provided mechanically by separate locking means and the latching means ensure that the mechanic connection maintains and the locking means stay engaged. In one example, the connection elements are already provided integrated with the component to be connected. For example, the connection elements are provided during the production of the component itself. In another example, the connection elements are provided after the production of the component itself, but before delivery for the assembly. Thus, the number of individual parts is reduced.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 1b shows a detailed part of the cross-section of FIG. 1a;

DETAILED DESCRIPTION

Figure 1A:
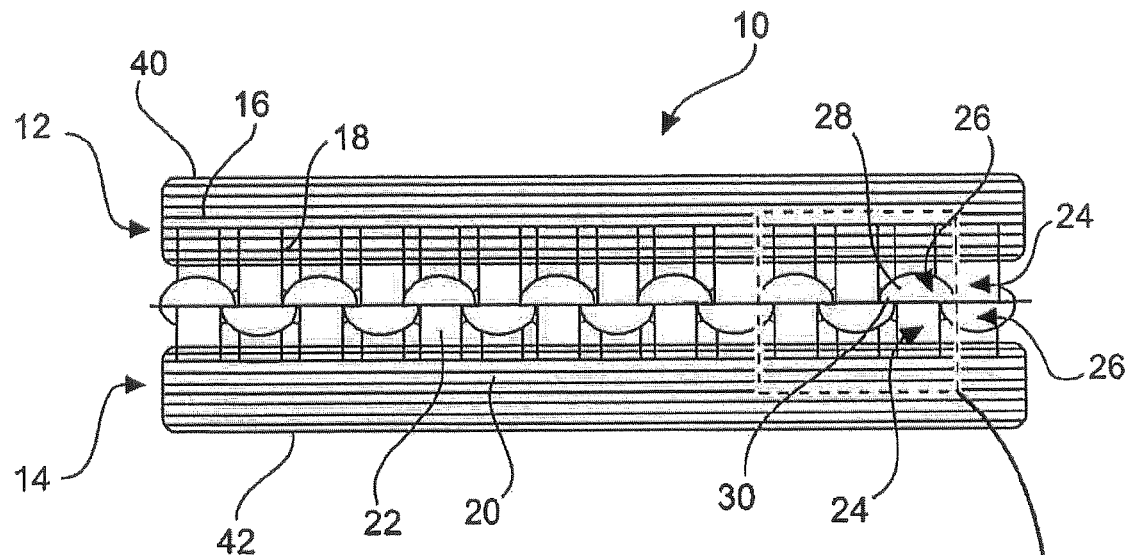
FIG. 1a shows a schematic cross-section through a mounting system according to an example.

FIG. 1a shows a mounting system 10 comprising a first mounting part 12 and a second mounting part 14. The first mounting part 12 comprises a first base part 16 with a first plurality of first locking means 18. The second mounting part 14 comprises a second base part 20 with a second plurality of second locking means 22. Components can be mounted to each other by the first and second mounting parts 12, 14.

Each of the locking means 18, 22 is attached to the respective base part 16, 20 and is provided with an attachment part 24 extending from the base part, i.e., the first base part 16 or the second base part 20, and a distal part 26 at the opposing end of the attachment part 24. The distal part 26 is provided as a head portion 28 with at least one engaging section 30 protruding sidewards over the attachment part 24.

Figure 1B:
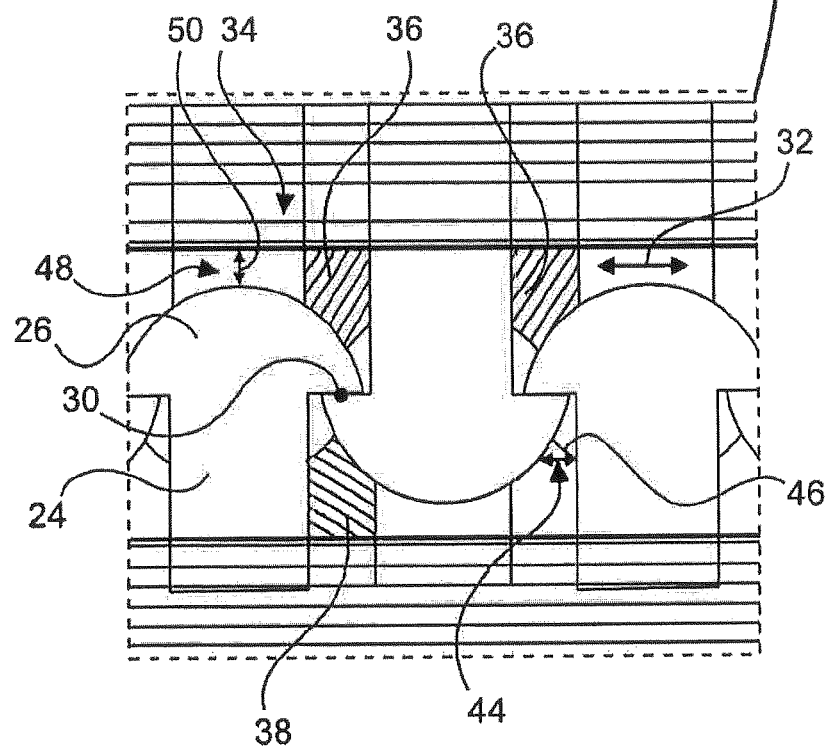

The first and second locking means 18, 22 are provided laterally displaceable in relation to the respective base part at least with the distal part 26 to allow sidewards displacement, indicated with double arrow 32 in FIG. 1b, of the engaging sections 30 for engagement and disengagement of the locking means 18, 22.

Thus, the first and second locking means 18, 22 provide a releasable engagement of the first and second base 16, 20. In the engaged state, latching means 34 are provided blocking the sidewards displacement of the engaging sections to an extent that a disengagement of the locking means is prevented.

FIG. 1b shows a detailed part of FIG. 1a with first latching means 36 with a first pattern in an upper area between the first base part 16 and the second base part 20. Still further, indicated with a second pattern, second latching means 38 are provided in the lower area between the two base parts. The latching means 36, 38 are also provided in other configurations, such as only the first pattern arrangement, i.e., in the upper region, or only the second pattern arrangement in the lower region.

The first and second locking means 18, 22 are each provided, as an example, in a chessboard-like pattern, wherein one "colour" of the chessboard pattern is provided on the first base part 16 and the other "colour" is provided on the second base part 20. Thus, each of the first locking means 18 is surrounded by four complementary second locking means 22 providing engagement section 30 at four locations around the first locking means 18, and vice versa.

It must be noted that the figures shown only relate to a cross-sectional view and the particular pattern of the locking means. However, in a further example, a different pattern of the locking means is provided, for example a hexagonal structure or a triangular structure, or the like.

In a first example, as shown in FIGS. 1a and 1b, the first base part 16 is formed integrally with a first component 40. The second base part 20 can also be provided formed integrally with a further component 42 that is to be mounted to the first component 40. The locking means, i.e., the first locking means 18 and the second locking means 22, are extending from the respective component 40, 42.

In a further example, not further shown, instead of the integrally formation, a flexible first base part and second base part are provided that are then securely fixed to a respective component to allow the mounting of two components.

As can be seen in FIG. 1b, in the engaged state, a lateral moving space 44 for lateral relative movement, indicated with a double arrow 46, of the distal parts is provided between a distal part of each locking means and the respective opposite base part. Further, also a further moving space 48 for movement of the base parts in a direction towards each other, as indicated by a second double arrow 50, is provided. The latching means 34 occupy at least an essential part of the moving space restricting the lateral movement of the distal parts 26. Further, the latching means 34 can also occupy at least an essential part of the further moving space 48 restricting the movement of the base parts 16, 20, in the direction towards each other. Thus, in the blocked state, the latching means 34 are provided along the respective base parts next to the attachment parts extending from the base to restrict the sidewards bending movement of the attachment parts and/or the sidewards movement of the distal parts.

Figure 2A:
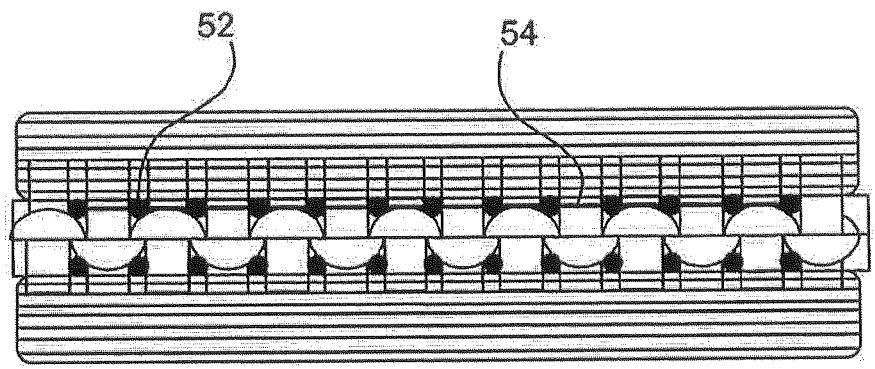
FIG. 2a shows a schematic cross-section of a further example with latching means provided as pins.

FIG. 2a shows an example, where the latching means 34 are provided as pins 52 inserted along at least one of the base parts next to the attachment parts extending from the base. The pins increase stability and strengthen the bond between the locking means. In one example, not further shown, pins are provided along only one base part, whereas FIG. 2a shows an example where the pins are provided along both base parts. Further, an example is provided where a plurality of the pins 52 is connected to a latch base 54, indicated with a single line only, forming a comb-shaped interlocking structure.

As indicated, the pins may be provided as longitudinal elements that, in the inserted state, extend in a direction parallel to the base part and transverse to the attachment parts of the locking means, which attachment parts extend from the base part. Further, the pins, in the inserted state, extend over at least a plurality of attachment parts.

In an example, the pins are provided as nail-like elements. The pins are preferably rigid nails. However, in another example, the pins are provided as nails that are flexible to a small degree.

In a yet further example, the pins are provided as longitudinal flexible elements that are sufficiently stiff and rigid to restrict the movement of the locking means, but flexibly enough to follow different contours of surfaces upon which the locking means are provided.

Figure 2B:
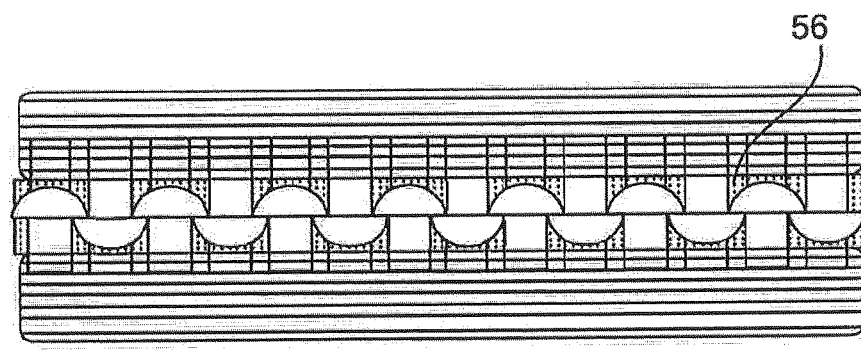
FIG. 2b shows a still further example with latching means provided as a space-occupying substrate.

FIG. 2b shows an example, where the latching means 34 are provided as a space-occupying substance 56 inserted into at least a part of the lateral moving space and/or the further moving space 44, 48. In the example shown, the complete space is occupied by the space-occupying substance. For example, the space-occupying substance 56 is a filler or matrix with a viscosity sufficiently fluid to allow an insertion into the space between the first and the second base, and sufficiently stiff to prevent an unwanted leakage.

In a further example, not further shown, the latching means 34 are provided as a volume-enlarging substance provision in the distal parts and/or the base parts to occupy at least a part of the lateral moving space and/or the further moving space upon activation. The volume-enlarging substance may be activated by the application of energy, for example ultrasound waves, increasing temperatures, or by chemical activation agents.

Figure 3:
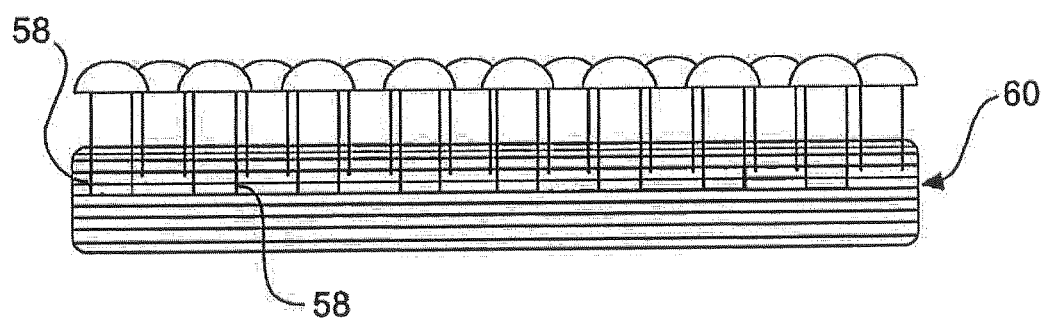
FIG. 3 shows a further example with locking means having different attachment depths in a substrate.

FIG. 3 shows an example, where the locking means, for example the first locking means 18 and/or the second locking means 22, are provided with two different attachment depths, as indicated with lines 58, in the base part, for example the first base part 16 and/or the second base part 20. For example, two or more attachment depths are provided, for example providing different anchoring depths in a laminate structure 60 as shown.

Figure 4A:
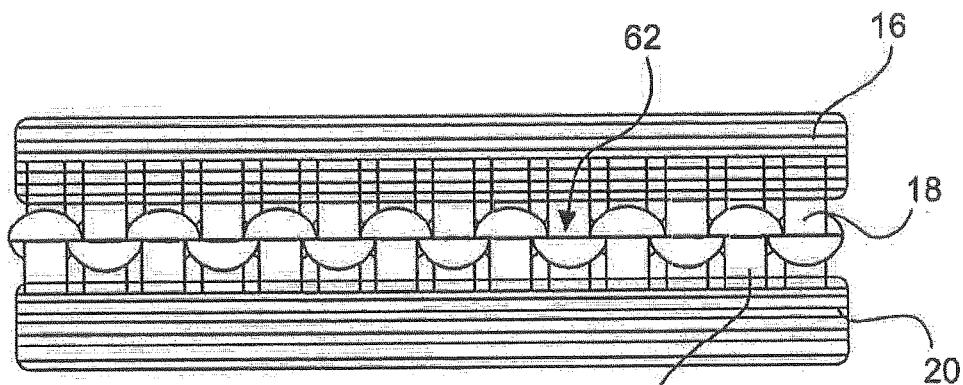
FIG. 4a shows a first schematic example of the arrangement of first and second locking means.

FIG. 4a shows a cross-section of an example with the first and second locking means 18, 22 as perpendicularly extending from the respective first and second base parts 16, 20. For example, the first and second locking means 18, 22 are provided as mushroom-like protrusions 62 providing a double mushroom engagement.

According to an example, the base parts are provided as longitudinal strips with a longitudinal extension direction, and the latching means are laterally insertable, for example as pins, in a direction transverse to the longitudinal extension direction (not further shown).

Figure 4B:
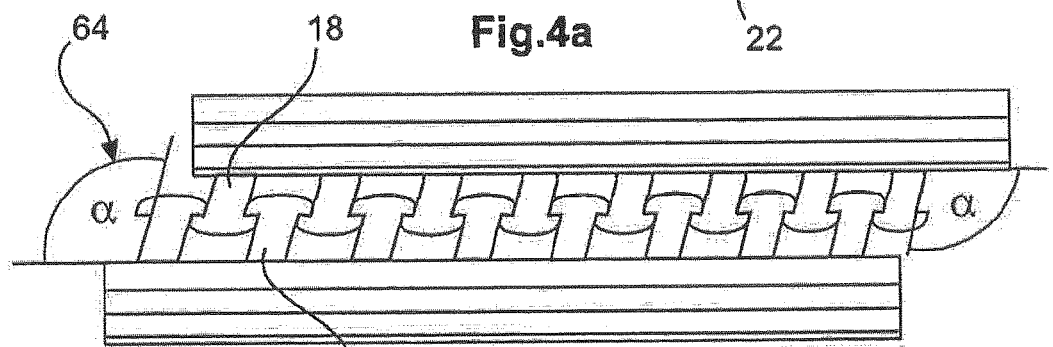
FIG. 4b shows a further example of inclined arranged first and second locking means in a first common direction.

FIG. 4b shows a double mushroom engagement, wherein the first and second locking means 18, 22 are provided with a first inclination angle 64.

Figure 4C:
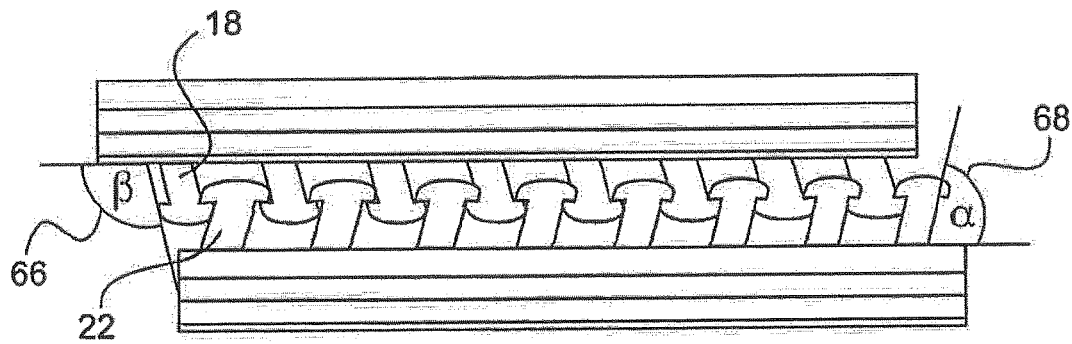
FIG. 4c shows first and second locking means in different inclination directions.

FIG. 4c shows an example, wherein a first inclination angle 66 is provided for the first locking means 18 and a second inclination angle 68 is provided for the second locking means 22.

Figure 4D:
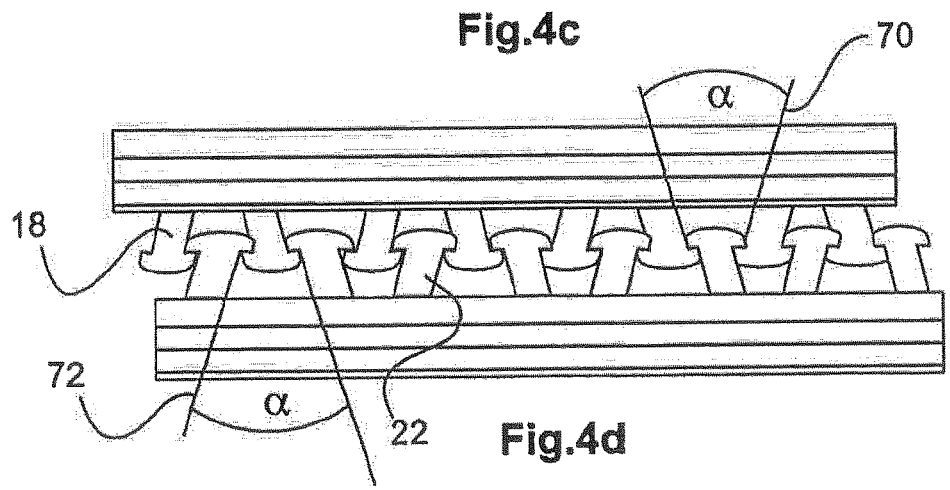
FIG. 4d shows first and second locking means with various inclination angles of the locking means of the respective first and second mounting parts.

FIG. 4d shows an example, where the first locking means 18 are provided with a first relative angle 70 in relation to each other. The second locking means 22 are provided with a second relative inclination angle 72 in relation to each other. For example, the first and second inclination angles 70, 72 are provided equal. In a further example, not further shown, the two inclination angles are different from each other.

Figure 5:
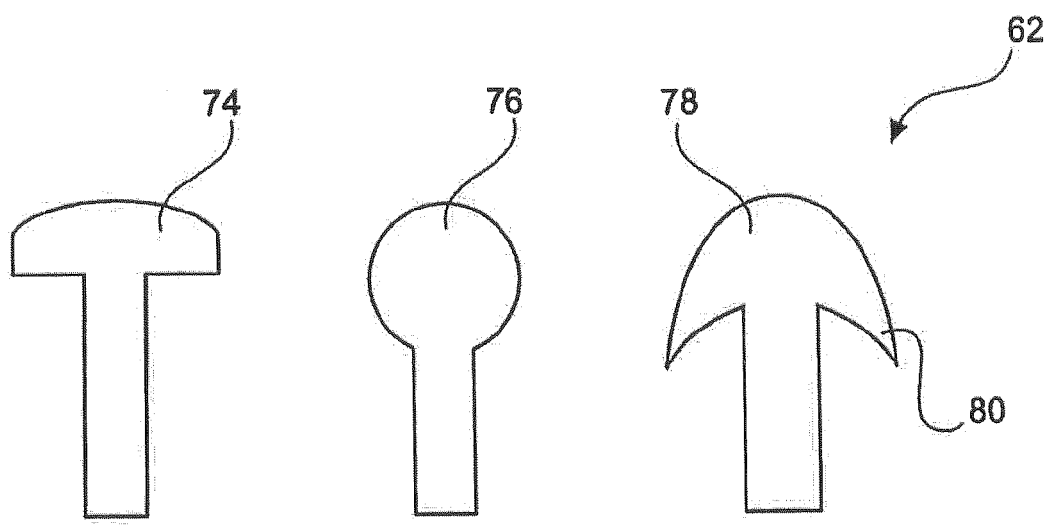
FIG. 5 shows schematic cross-sections through different examples of locking means having different shapes.

FIG. 5 shows examples of the mushroom-like protrusions 62, for example having a rectangular head portion 74 with a slightly rounded upper part. For example, the upper part can be provided as a dome-shaped head. Further, a spherical head 76 is shown. Still further, an arrow-shaped head 78 with protruding arrowhead end portions 80 is provided.

Figure 6A:
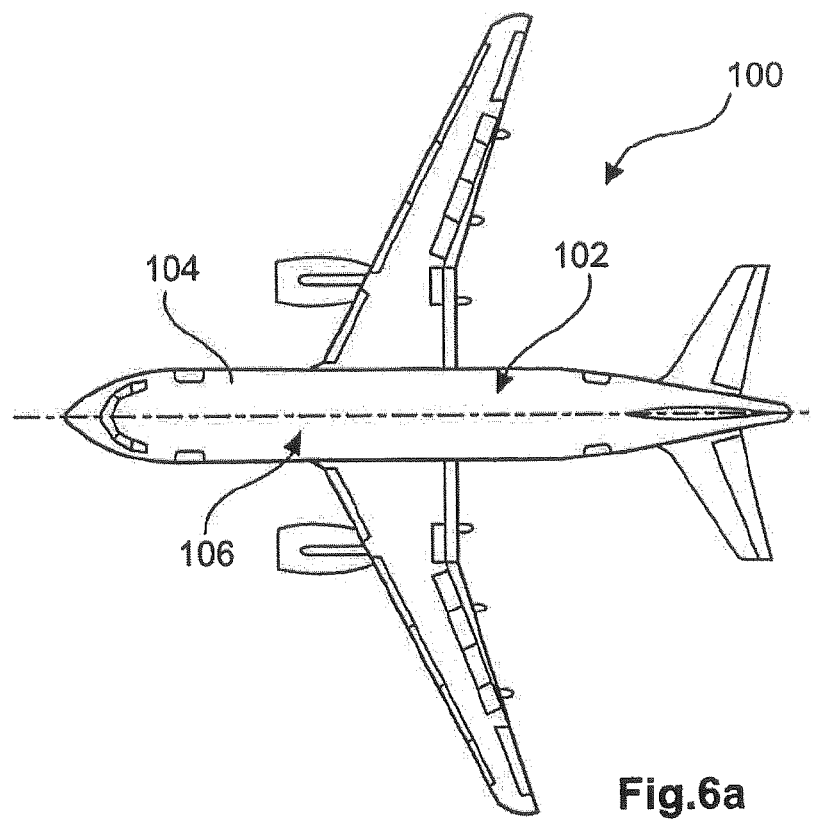
FIG. 6a shows a schematic overview of an aircraft as an example of a vehicle with components mounted to each other with a mounting system.

In FIG. 6a, an aircraft 100 is shown as an example for a vehicle 100. The aircraft comprises a support structure 102 (not further shown in detail) and an enclosing structure 104. Further, a technical structure 106 is provided, for example hidden by the enclosing structure 104. A plurality of components is provided that are mounted to each other. At least some components are mounted to each other with a mounting system 10 according to one of the preceding examples. For example, partition, wall segments and other components of the cabin interior are mounted using the mounting system 10. For changing the cabin layout the mounting system can easily be unlocked to provide the release function of the locking means. As a further example, cabin lining is attached to the fuselage structure, also at least partly using the mounting system 10.

Figure 6B:
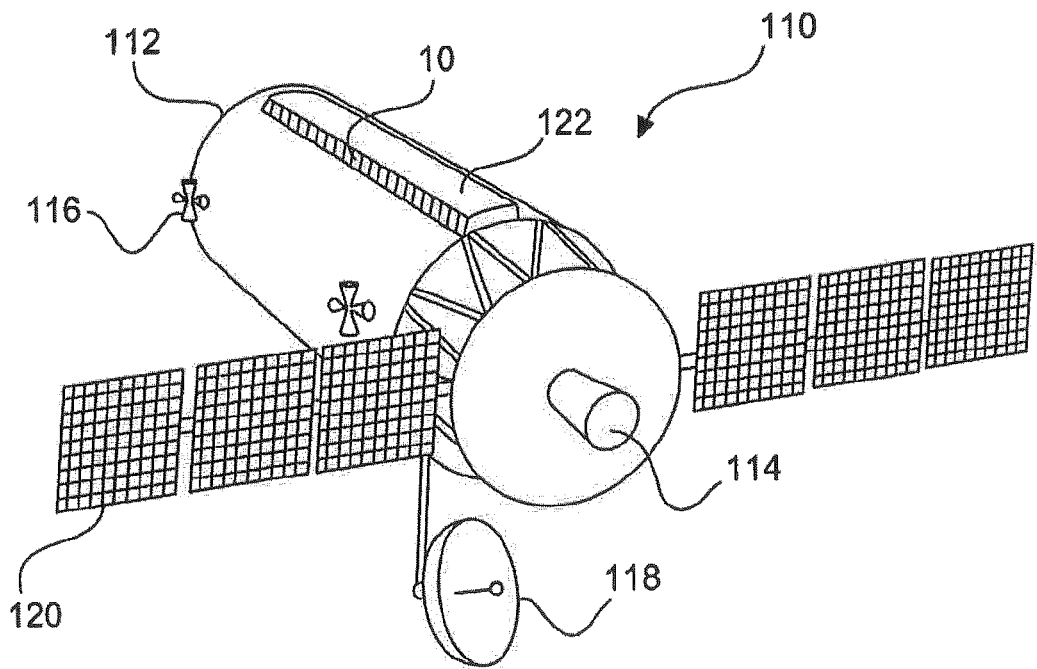
FIG. 6b shows a schematic overview of a satellite as a further example of a vehicle with components mounted to each other with a mounting system.

In FIG. 6b, a satellite 110 as another example for a vehicle is shown. The satellite comprises a main body housing 112, a propulsion system 114, an attitude control system 116, an antenna device 118 and photovoltaic panel array 120. Further, a service and maintenance panel 122 is provided in an outer part of the main body housing 112. The service and maintenance panel 122 is mounted with the mounting system 10 to allow a secure mounting that can also be released from the outside, for example by astronauts for service or repair.

Figure 7:
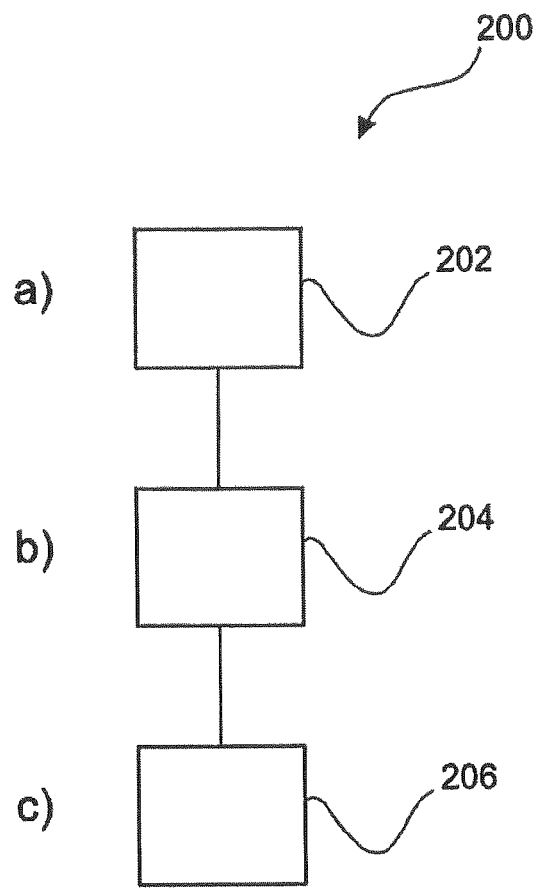
FIG. 7 shows basic steps of an example of a method for mounting of components.

FIG. 7 shows a method 200 with a first step 202, in which a first mounting part is provided comprising a first base part with a first plurality of first locking means. Further, in the first step 202, also a second mounting part is provided comprising a second base part with a second plurality of second locking means. Each of the locking means is attached to the respective base part and is provided with an attachment part extending from the base part, and a distal part at the opposing end of the attachment part. The distal part is provided as a head portion with at least one engaging section protruding sidewards over the attachment part. The first and second locking means are provided laterally displaceable in relation to the respective base part at least with the distal part to allow sidewards displacement of the engaging sections for engagement and disengagement of the locking means. The first and second locking means provide a releasable engagement of the first and the second base. In a second step 204, the first and the second locking means are pressed against each other and the first and the second locking means are engaged for mounting of the first mounting part and the second mounting part to each other. In a third step 206, latching means are provided blocking the sidewards displacement of the engaging sections to an extent that a disengagement of the locking means is prevented.

The first step 202 is also referred to as step a), the second step 204 as step b), and the third step 206 as step c).

In an example, between step a) and step b) it is provided a step of a1) attaching the first base and the second base securely to a respective first and second component that are to be mounted to each other.

In a further example, between step b) and c), the engagement of the locking means is disengaged and the two components are aligned or adjusted in their relative position. For example, the aligning/adjusting is provided in a loop-like or repetitive fashion.

The provision of a releasable engagement and the provision of a fixation means for blocking the releasable engagement is based on a mushroom-like fastener concept. This provides reduction of mounting time, and also weight reduction and improves the ergonomic situation during the manufacturing process for the staff handling the components. The mushroom-type fasteners can be made of metal or plastic. In an example, they are laminated into carbon fibre matrix layers of a component that is to be mounted to another component. By adding the locking means in the top few layers of the carbon fibre and then curing, different attachment and thus load transmission depths can be provided.

According to the present invention, the manufacturing and assembly procedure is increased and thus a shorter time frame for assembly is provided. Further, components can be mounted without the need of surface preparation. As a further advantage, rivets can be omitted due to the secure mounting of the mounting system due to the latching means providing secure fixation. Besides the facilitated aligning and assembly steps, it must be also noted that due to the provision of a dust-free assembly, installation of equipment for dust relevant areas can be provided. Still further, by providing the mechanical fixation, mounting of components is also possible in areas where the provision of glue is not possible, or only possible with restrictions, such as within fuel tanks.

It has to be noted that embodiments of the invention are described with reference to different subject matters, e.g., devices, systems and methods. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single device or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:
1. A mounting system, comprising:
a first mounting part comprising a first base part with a first plurality of first locking means;
a second mounting part comprising a second base part with a second plurality of second locking means;

wherein the first and the second mounting parts are configured to mount components to each other by the first and the second mounting parts;

wherein each of the locking means is attached to the respective base part and comprises an attachment part extending from the base part, and a distal part at the opposing end of the attachment part; wherein the distal part comprises a head portion with at least one engaging section protruding sidewards over the attachment part;

wherein the first and second locking means are laterally displaceable in relation to the respective base part at least with the distal part to allow sidewards displacement of the engaging sections for engagement and disengagement of the locking means;

wherein the first and second locking means provide a releasable engagement of the first and the second bases;

wherein in the engaged state, latching means are provided blocking the sidewards displacement of the engaging sections to an extent that a disengagement of the locking means is prevented;

wherein the latching means are removable thereby providing temporary secure fixation of the components to be mounted to each other, and wherein the latching means comprise pins inserted along at least one of the base parts next to the attachment parts extending from the base.

2. The mounting system according to claim 1, wherein at least one of the first and the second base parts is formed integrally with a component to be mounted to another component; and wherein the locking means are extending from the component.

3. The mounting system according to claim 1, wherein the first and/or the second locking means comprise at least two different attachment depths in the first and/or second base part respectively.

4. The mounting system according to claim 1, wherein the latching means are removable when the locking means are in engagement with each other forming a mounting state of the two mounting parts.

5. The mounting system according to claim 1, wherein in the engaged state:

lateral moving space for lateral relative movement of the distal parts is provided between the distal part of each locking means and the respective opposite base part; wherein the latching means occupy at least an essential part of the moving space restricting the lateral movement of the distal parts; and/or further moving space for movement of the base parts in a direction towards each other is provided; wherein the latching means occupy at least an essential part of the further moving space restricting the movement of the base parts in the direction towards each other.

6. The mounting system according to claim 1, wherein in the engaged state, the latching means are provided along the respective base parts next to the attachment parts extending from the base to restrict at least one of:

the sidewards bending movement of the attachment parts; and the sidewards movement of the distal parts.

7. The mounting system according to claim 1, wherein the pins are longitudinal elements that, in the inserted state, extend in a direction parallel to the base part and transverse to the attachment parts of the locking means, which attachment parts extend from the base part; wherein the pins, in the inserted state, extend over at least a plurality of attachment parts.

8. The mounting system according to claim 7, wherein the pins comprise rigid nail-like structures.

9. The mounting system according to claim 7, wherein the pins comprise longitudinal flexible elements that are sufficiently stiff and rigid to restrict the movement of the locking means, but flexibly enough to follow different contours of surfaces upon which the locking means are provided.

10. The mounting system according to claim 1, wherein a plurality of the pins is connected to a latch-base forming a comb-shaped interlocking structure.

11. The mounting system according to claim 1, wherein the first and second locking means comprise mushroom-like protrusions providing a double-mushroom engagement.

12. The mounting system according to claim 1, wherein the base parts comprise longitudinal strips with a longitudinal extension direction; and wherein the latching means are laterally insertable in a direction transverse to the longitudinal extension direction.

13. A vehicle, comprising:

a support structure;

an enclosing structure; and a technical structure;

wherein a plurality of components are mounted to each other, wherein at least some components are mounted to each other with a mounting system, wherein the vehicle is an aircraft or spacecraft, wherein the mounting system comprises:

a first mounting part comprising a first base part with a first plurality of first locking means;

a second mounting part comprising a second base part with a second plurality of second locking means;

wherein the first and the second mounting parts are configured to mount components to each other by the first and the second mounting parts;

wherein each of the locking means is attached to the respective base part and comprises an attachment part extending from the base part, and a distal part at the opposing end of the attachment part; wherein the distal part comprises a head portion with at least one engaging section protruding sidewards over the attachment part;

wherein the first and second locking means are laterally displaceable in relation to the respective base part at least with the distal part to allow sidewards displacement of the engaging sections for engagement and disengagement of the locking means;

wherein the first and second locking means provide a releasable engagement of the first and the second base;

wherein in the engaged state, latching means are provided blocking the sidewards displacement of the engaging sections to an extent that a disengagement of the locking means is prevented, wherein the latching means are removable thereby providing temporary secure fixation of the components to be mounted to each other, and wherein the latching means comprise pins inserted along at least one of the base parts next to the attachment parts extending from the base.

* * * * *